United States Patent
Kaminsky et al.

(10) Patent No.: US 6,890,642 B2
(45) Date of Patent: May 10, 2005

(54) SURFACE FORMED LENSES ON VOIDED POLYMER LIGHT DIFFUSER

(75) Inventors: Cheryl J. Kaminsky, Rochester, NY (US); Robert P. Bourdelais, Pittsford, NY (US); Thomas M. Laney, Spencerport, NY (US); Michael R. Brickey, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/095,601

(22) Filed: Mar. 11, 2002

(65) Prior Publication Data

US 2003/0170442 A1 Sep. 11, 2003

(51) Int. Cl.[7] .......................... B32B 27/00; G02B 27/10
(52) U.S. Cl. ................ 428/319.3; 428/318.4; 428/304.4; 428/913; 359/707; 359/628; 359/622; 359/599; 359/741
(58) Field of Search ................ 428/304.4, 306.6, 428/308.4, 319.3, 913, 901; 385/599; 359/707, 599, 455, 622, 95, 628, 741

(56) References Cited

U.S. PATENT DOCUMENTS

| | | | | |
|---|---|---|---|---|
| 4,427,265 A | * | 1/1984 | Suzuki et al. ............... | 359/599 |
| 4,770,931 A | * | 9/1988 | Pollock et al. ........... | 428/304.4 |
| 5,511,140 A | * | 4/1996 | Cina et al. ..................... | 385/93 |
| 6,048,606 A | * | 4/2000 | Bourdelais et al. ...... | 428/304.4 |
| 6,063,552 A | * | 5/2000 | Bourdelais et al. ......... | 430/363 |
| 6,130,777 A | * | 10/2000 | Yamashita et al. .......... | 359/456 |
| 6,266,476 B1 | | 7/2001 | Shie et al. | |
| 6,270,697 B1 | | 8/2001 | Myers et al. | |
| 6,721,102 B2 | * | 4/2004 | Bourdelais et al. ......... | 359/628 |
| 2002/0146518 A1 | * | 10/2002 | Kusume et al. | |
| 2003/0169499 A1 | * | 9/2003 | Bourdelais et al. | |
| 2003/0169513 A1 | * | 9/2003 | Kaminsky et al. | |

OTHER PUBLICATIONS

Copending Application No. 10/095,145, Bourdelais et al., "Surface Formed Complex Multi–Layered Polymer Lenses For Light Diffusion," Sep. 11, 2003.*

Copending Application No. 10/095,172, Kaminsky et al., "Surfaced Formed Complex Polymer Lenses Diffuse Reflector," Sep. 11, 2003.*

* cited by examiner

Primary Examiner—Hai Vo
(74) Attorney, Agent, or Firm—Arthur E. Kluegel (57) ABSTRACT

Disclosed is a transparent polymeric diffusion film exhibiting at least 50% transmissivity containing a thermoplastic polymeric material with internal microvoids and containing a plurality of complex lenses on a surface thereof. Such films are useful for diffusing light when it is desired to provide and even light distribution.

50 Claims, 2 Drawing Sheets

SURFACE FORMED LENSES ON VOIDED POLYMER LIGHT DIFFUSER

CROSS REFERENCE TO RELATED APPLICATIONS

This application is one of a group of seven applications co-filed under Ser. Nos. 10/095,204, 10/095,601, 10/095,145, 10/095,172, 10/095,319, 10/094,977 and 10/094,979.

FIELD OF THE INVENTION

The invention relates to a transparent polymeric film having a top and bottom surface and comprising on a surface a plurality of convex or concave complex lenses useful as a diffuser for specular light. In a preferred form, the invention relates to a back light diffuser for liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need for a separate film. In the case of light management in a LCD, this increases efficiency by removing an interface (which causes reflection and lost light).

In U.S. Pat. No. 6,270697 (Meyers et al.), blur films are used to transmit infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. The materials disclosed in U.S. Pat. No. 6,266,476 shape and collimate light, and therefore are not efficient diffusers of light particularly for liquid crystal display devices.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

U. S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptable reduce the brightness of the LC device.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

PROBLEM TO BE SOLVED BY THE INVENTION

There remains a need for an improved light diffusion of image illumination light sources to provide improved diffuse light transmission while simultaneously diffusing specular light sources.

SUMMARY OF THE INVENTION

The invention provides a transparent polymeric diffusion film exhibiting at least 50% transmissivity containing a thermoplastic polymeric material with internal microvoids and containing a plurality of complex lenses on a surface thereof. The invention also provides a light diffuser for rear projection displays, back-lighted imaging media, a liquid crystal display component and device, and a method for forming a plurality of polymeric complex lenses in a desired pattern on a substantially circular voided polymer support.

ADVANTAGEOUS EFFECT OF THE INVENTION

The invention provides improved light transmission while simultaneously diffusing specular light sources.

DETAILED DESCRIPTION OF THE INVENTION

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The surface lenslet structure polymer layer of the invention can be easily changed to achieve the desired diffusion and light transmission requirements for many liquid crystal devices thus allowing the invention materials to be responsive to the rapidly changing product requirements in the liquid crystal display market.

The voided polymer layer of the invention can be easily changed to achieve the desired diffusion and light transmission requirements for many liquid crystal devices thus allowing the invention materials to be responsive to the rapidly changing product requirements in the liquid crystal display market.

The invention reduces the need for an air gap between prior art light diffusers that contain a rough surface and the brightness enhancement films used in liquid crystal display devices. Because the lenses can be applied on one side of the voided polymer base, an additional skin layer is provided to eliminate the need for an air gap between the brightness enhancement film and the light diffuser. The elimination of the air gap allows for the diffuser materials to be adhesively bonded to other film components in the liquid crystal display making the unit lighter in weight and lower in cost. Further, combining air voided polymer diffusion surfaces in the bulk of the base and lenses on the surface, the diffuser can be used to both shape and diffuse the light as the geometry of the air voids and the lenses can differ to perform separate light diffusion tasks. For example, the air voided polymer could perform large scale diffusion and the lenses can diffuse with a smaller cone angle which would result in a light diffuser with a high % light diffusion and a small diffusion cone angle.

The voided polymer layer of the invention has a high resistance to heat flow and therefore can be used to insulate the complex lenses of the invention from extreme ambient environmental conditions or from hot light sources contained in portable LC devices for example. The invention materials do not contain inorganic particles typical for prior art voided polymer films that cause unwanted scattering of the back light source and reduce the transmission efficiency of the liquid crystal display device. Further, the elastic modulus and scratch resistance of the diffuser is improved over prior art cast coated polymer diffusers rendering a more robust diffuser during the assembly operation of the liquid crystal device.

The elastic modulus and scratch resistance of the diffuser is improved over prior art cast coated polymer diffusers rendering a more robust diffuser during the assembly operation of the liquid crystal device. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y plane. The term "pattern" means any predetermined arrangement of lenses whether regular or random.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, microvoided polymer film, or coating the film with matte resins or beads. The role of the front diffuser is to broaden the light coming out of the liquid crystal (LC) with directional selectivity. The light is compressed into a tight beam to enter the LC for highest efficiency and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets which the minor lenses are formed randomly on top of. "Minor lenses" mean lenses smaller than the major lenses that are formed on the major lenses. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

The term "polymer" means homo- and co-polymers. The term microbead means polymeric spheres typically synthesized using the limited coalescence process. These microbead spheres can range in size from 0.2 to 30 micrometers. They are preferably in the range of 0.5 to 5.0 micrometers. The term microvoids means pores formed in an oriented polymeric film during stretching. These pores are initiated by either inorganic particles, organic particles, or microbeads. The size of these voids is determined by the size of the particle or microbeads used to initiate the void and by the stretch ratio used to stretch the oriented polymeric film. The pores can range from 0.6 to 150 $\mu$m's in machine and cross machine directions of the film. They can range from 0.2 to 30 micrometers in height. Preferably the machine and cross machine direction pore size is in the range of 1.5 to 25 micrometers. Preferably the height of the pores is in the range of 0.5 to 5.0 micrometers. The term substantially circular means indicates a geometrical shape where the major axis is no more than two times the minor axis.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. There are at least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

A diffuser comprising a layer exhibiting at least 50% transmissivity and containing thermoplastic polymeric material with internal microvoids and comprising a plurality of convex and/or concave complex lenses on a surface thereof is preferred. Curved concave and convex polymer lenses have been shown to provide very efficient diffusion of light. Further, the polymer lenses of the invention are transparent, enabling a high transmission of light and allowing LC displays to emit more light. By applying the curved complex or concave lenses to a microvoided polymer sheet, the invention has dual light diffusion capabilities. The invention combines the best of a surface diffuser, mainly the ability to achieve light diffusion utilizing the index of refraction of air to polymer, and the best of bulk diffusion, mainly, the ability to place the diffuser in optical contact with other optical components such as brightness enhancement films, display screens and polarizer sheets. Further, the dual light diffuser of the invention provides a means to perform light diffusion and light shaping by providing asymmetrical lenses and symmetrical voids in the bulk of the base material.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

In one embodiment of the invention, convex lenses are present on the top surface and convex lenses are present on the bottom surface of the transparent polymeric film. The placement of convex lenses on both sides of the polymer film creates stand off from other adjacent films providing the necessary air gap required for efficient diffusion by the lenses.

In another embodiment of the invention, convex lenses are present on the top surface and concave lenses are present on the bottom surface of the transparent polymeric film. The placement of convex lenses on the top side of the polymer film creates stand off from other adjacent films providing the necessary air gap required for efficient diffusion by the lenses. The placement of concave lenses on the bottom side of the polymer film creates a surface that can be in optical contact with the adjacent films and still effectively diffuse the light.

In another embodiment of the invention, concave lenses are present on the top surface and concave lenses are present on the bottom surface of the transparent polymeric film. The placement of concave lenses on both sides of the polymer film creates a surface that can be in optical contact with the adjacent films on either side and still effectively diffuse the light.

In another embodiment of the invention, concave lenses are present on the top surface and convex lenses are present on the bottom surface of the transparent polymeric film. The placement of concave lenses on the top side of the polymer film creates a surface that can be in optical contact with the adjacent films and still effectively diffuse the light. The placement of convex lenses on the bottom side of the polymer film creates stand off from other adjacent films providing the necessary air gap required for efficient diffusion by the lenses.

Preferably, the concave or convex lenses have an average frequency in any direction of from 4 to 250 complex lenses/mm. When a film has an average of 285 complex lenses/mm, creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The preferred transparent polymeric film has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the diameter of the smaller lenses is preferably not more than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the polymeric support comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the transparent polymeric film, the polymeric support comprises a carbonate repeating unit. Polycarbonates have high optical transmission values compared to polyolefin polymers and therefore can improve the brightness of display devices.

In another embodiment of the invention, the polymeric support comprises an olefin repeating unit. Polyolefins are low in cost and have good strength and surface properties.

In another embodiment of the invention the polymeric support comprises a cellulose acetate. Tri acetyl cellulose has both high optical transmission and low optical birefringence allowing the diffuser of the invention to both diffuse light and reduce unwanted optical patterns.

The preferred diffuse light transmission of the diffuser material of the invention is greater than 50%. Diffuser light transmission less than 45% does not let a sufficient quantity of light pass through the diffuser, thus making the diffuser inefficient. A more preferred diffuse light transmission of the lenslet film is at least 80 typically from 80 to 95%. An 80% diffuse transmission allows an LC device to have improved battery life and increased screen brightness. The most preferred diffuse transmission of the transparent polymeric film is at least 92%. A diffuse transmission of 92% allows diffusion of the back light-source and maximizes the brightness of the LC device significant improving the image quality of an LC device for outdoor use where the LC screen must compete with natural sunlight.

Preferably, the concave or convex lenses are semispherical meaning that the surface of each lenslet is a sector of a sphere, but not necessarily a hemisphere. This provides excellent even diffusion over the x-y plane. The semispherical shaped lenses scatter the incident light uniformly, ideal for a backlit display application where the display area needs to be lit uniformly.

In another embodiment of the invention, the concave or convex lenses are aspherical meaning that width of the lenses differ in the x and y direction. This scatters light selectively over the x-y plane. For example, a particular x-y aspect ratio might produce an elliptical scattering pattern. This would be useful in the front of a LC display, spreading the light more in the horizontal direction than the vertical direction for increased viewing angle.

The convex or concave lenses preferably have a height/diameter ratio of from 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of from 0.25 to 0.48. It has been found that the most efficient diffusion occurs in this range.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is from 5 to 18 minor lenses per major lens. This range has been shown to produce the most efficient diffusion.

The thickness of the transparent polymeric film preferably is not more than 250 micrometers or more preferably from 12.5 to 50 micrometers. Current design trends for LC devices are toward lighter and thinner devices. By reducing the thickness of the light diffuser to not more than 250 micrometers, the LC devices can be made lighter and thinner. Further, by reducing the thickness of the light diffuser, brightness of the LC device can be improved by reducing light transmission. The more preferred thickness of the light diffuser is from 12.5 to 50 micrometers which further allows the light diffuser to be convienently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to withstand the rigors of the assembly process compared to prior art cast diffusion films which are delicate and difficult to assemble.

Figure 1:
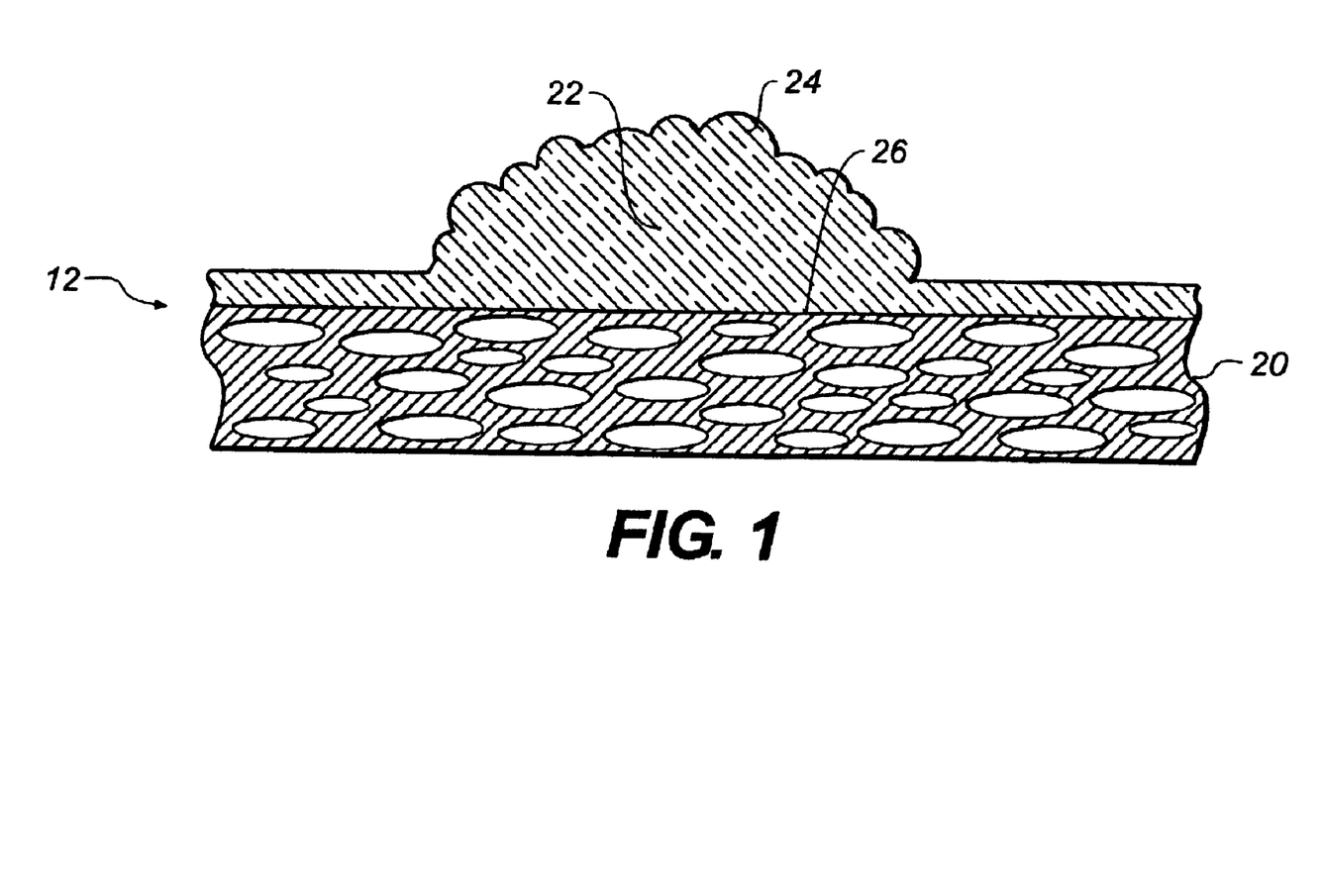
FIG. 1 illustrates a cross section of a complex lens formed on a voided polymer base material suitable for use in a liquid crystal display device.

FIG. 1 illustrates a cross section of a surface formed complex lenses on voided polymer light diffuser suitable for use in a liquid crystal display device. Light diffusion film 12 comprises microvoided polymer base 20, onto which major lens 22 is applied to the surface of microvoided polymer base 26. Minor lenses 24 are on the surface of the major lens 22. The invention comprises a plurality of minor lenses 24 on the surface of the major lens 22. The light diffuser of the invention contains many diffusion surfaces from the major lens 22, the minor lenses 24 and the microvoided polymer base 20.

Figure 2:
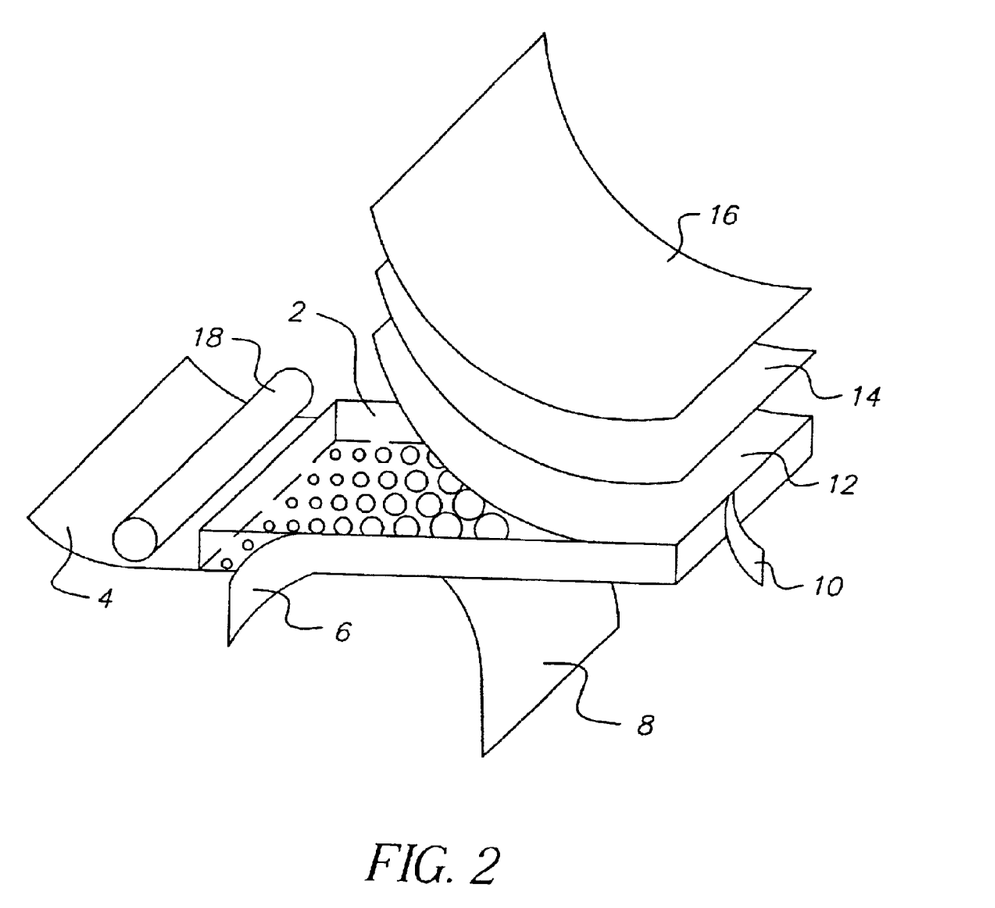
FIG. 2 illustrates a liquid crystal display device with a surface formed complex lenses on voided polymer light diffuser.

FIG. 2 illustrates a liquid crystal display device with a light diffuser. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. Light diffusion film 12 in the form of a transparent polymeric film is utilized to diffuse light energy exiting the light guide in a direction perpendicular to the light diffuser. Brightness enhancement film 14 is utilized to focus the light energy into polarization film 16. The light diffusion film 12 is in contact with brightness enhancement film 14.

The invention provides a film that scatters the incident light uniformly. The oriented film of the present invention can be produced by using a conventional film-manufacturing facility in high productivity. The invention utilizes a voided thermal plastic layer containing microvoids. Microvoids of air in a polymer matrix are preferred and have been shown to be a very efficient diffuser of light compared to prior art diffuser materials which rely on surface roughness on a polymer sheet to create light diffusion for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduces thus extending the life of a battery. The preferred diffuse light transmission of the diffuser material of the invention are greater than 65%. Diffuser light transmission less than 60% does not let a sufficient quantity of light pass through the diffuser, thus making the diffuser inefficient. A more preferred diffuse light transmission of the microvoided thermoplastic voided layer is greater than 80%. An 80% diffuse transmission allows the LC device to improve battery life and increase screen brightness. The most preferred diffuse transmission of the voided thermoplastic layer is greater than 87%. A diffuse transmission of 87% allows diffusion of the back light source and maximizes the brightness of the LC device significant improving the image quality of an LC device for outdoor use where the LC screen must compete with natural sunlight.

Since the microvoids of the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble. A light diffuser with an impact resistance greater than 0.6 GPa is preferred. An impact resistance greater than 0.6 GPa allows the light diffuser to resist scratching and mechanical deformation that can cause unwanted uneven diffusion of the light causing "hot" spots in an LC device.

The thickness of the light diffuser preferably is less than 250 micrometers or more preferably between 12.5 and 50 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved by reducing light transmission. The more preferred thickness of the light diffuser is between 12.5 and 50 micrometers which further allows the light diffuser to be conveniently combined with a other optical materials in an LC device such as brightness enhancement films. Further, by reducing the thickness of the light diffuser, the materials content of the diffuser is reduced.

The thickness uniformity of the light diffuser across the diffuser is preferably less than 0.10 micrometers. Thickness uniformity is defined as the diffuser thickness difference between the maximum diffuser thickness and the minimum diffuser thickness. By orienting the light diffuser of the invention, the thickness uniformity of the diffuser is less than 0.10 micrometers, allowing for a more uniform diffusion of light across the LC device compared to cast coated diffuser. As the LC market moves to larger sizes (40 cm diagonal or greater), the uniformity of the light diffusion becomes an important image quality parameter. By providing a voided light diffuser with thickness uniformity less than 0.10 micrometers across the diffusion web, the quality of image is maintained.

FIG. 1 illustrates a cross section voided polymer diffusion material suitable for use in a liquid crystal display device. Light diffuser 12 comprises the polymer matrix 26 and air voids 24. The surface layer 22 contains air voids that are open and not contained in polymer matrix 26. The surface roughness of light diffuser 12 is higher than a continuous polymer layer because of the open air voids at the surface of the light diffuser.

FIG. 2 illustrates a liquid crystal display device with a light diffuser. Visible light source 18 is illuminated and light is guided into acrylic board 2. Reflector tape 4 is used to focus of axis light energy into the acrylic board 2. Reflection tape 6, reflection tape 10 and reflection film 8 are utilized to keep light energy from exiting the acrylic board in an unwanted direction. Polymer voided light diffuser 12 is utilized to diffuse light energy exiting the acrylic board in the direction perpendicular to the diffusion film. Brightness enhancement film 14 is utilized to focus the light energy into polarization 16. The polymer voided light diffuser 12 containing a voided polymer layer is in contact with brightness enhancement film 14.

For light diffuser of the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. The light diffuser film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer. A polymer sheet having a percent transmission greater than 65%.

The thermoplastic diffuser of the invention is preferably provided with a one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers, followed by biaxial orientation, whereby voids are formed around void-initiating material contained in the thin layers.

Polyester microvoided light diffusers are also preferred as oriented polyester has excellent strength, impact resistance and chemical resistance. The polyester utilized in the invention should have a glass transition temperature between about 50.degree. C. and about 150. degree. C., preferably about 60-100.degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to the microvoided polyester diffusion sheet which may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

Addenda is preferably added to a polyester skin layer to change the color of the imaging element. Colored pigments that can resist extrusion temperatures greater than 320.degree. C. are preferred as temperatures greater than 320.degree. C. are necessary for co-extrusion of the skin layer.

An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumanin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The polyester diffuser sheets may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The oriented thermoplastic diffuser sheets of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss, etc. The tacky adhesive is preferably those having a refractive index close to that of the oriented film to suppress the interfacial reflection loss of light.

The oriented thermoplastic diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The oriented thermoplastic diffuser sheet of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The micro void-containing oriented film of the present invention usually has optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence Δn which is a difference between the refractive index in the slow optic axis direction and the refractive index in the fast optic axis direction in the plane of the film, i.e. Δn*d (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn.*d since the level depends upon the application of the film, however, it is preferably 50 nm or more.

The microvoid-containing oriented film of the present invention has a function to diffuse the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission. "Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape which is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Microvoids formed from organic spheres are preferred because they are low in light scattering, have been shown to form substantially circular voids and are easily dispersed in polyester. Further, the size and the shape of the voided diffuser layer can be changed by proper selection of organic sphere size and amount. Microvoids that are substantially free of scattering inorganic particles is also preferred. Prior art voided polymer layers that use inorganic particles such as clay, $TiO_2$ and silica have been shown to unacceptably scatter visible light energy. Scattering light energy from the back light source reduces the efficiency of the display unit by scattering light energy away from the LC and back toward the light source. It has been shown that inorganic micro-voiding particles can cause as much as 8% loss in transmitted light energy.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

The organic void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is pre-shaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Preferred crosslinked polymer beads have a mean particle size less than 2.0 micrometers, more preferably between 0.3 and 1.7 micrometers. Crosslinked polymer beads smaller than 0.3 micrometers are prohibitively expensive. Crosslinked polymer beads larger than 1.7 micrometers make voids that large and do not scatter light efficiently. Suitable cross-linked polymers for the microbeads used in void formation during sheet formation are polymerizable organic materials which are members selected from the group consisting of an alkenyl aromatic compound having the general formula wherein Ar represents an aromatic hydrocarbon radical, or an aromatic halohydrocarbon radical of the benzene series and R is hydrogen or the methyl radical; acrylate-type monomers including monomers of the formula wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH, wherein n is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening to produce beads spanning the range of the original distribution of sizes. Other processes such as suspension polymerization and limited coalescence directly yield very uniformly sized particles. U.S. Pat. No. 6,074,788, the disclosure of which is incorporated for reference. It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

The microbeads of cross-linked polymer range in size from 0.1–50 µm, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads. The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of films to the uniaxial orientation of microvoided films. Balanced microvoids are largely circular in the plane of orientation. The size of the microvoids and the ultimate physical properties depend upon the degree and balance of the orientation, temperature and rate of stretching, crystallization kinetics, the size distribution of the microbeads, and the like. The film supports according to this invention are prepared by: (a) forming a mixture of molten continuous matrix polymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The diffuser sheet of the invention may also be used in conjunction with another light diffuser, for example a bulk diffuser, a lenticular layer, a beaded layer, a surface diffuser, a holographic diffuser, a micro-structured diffuser, another lens array, or various combinations thereof The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or $\Delta$ metal oxide or a filler.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-strectched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person, etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, surface formed lenses on a voided polymer light diffuser were created by extrusion casting an extrusion grade polyolefin polymer against a pattered chill roll containing the complex lens geometry. The patterned polyolefin polymer, in the form the complex lens was then transferred to a voided polyester web material thereby forming a microvoided light diffuser with complex surface lenses. This example will show that complex surface lenses formed on a voided polymer web material provide exceptional light diffusion compared to complex polymer lenses formed on the surface of a transparent polymer web, a microvoided base and a prior art light diffuser utilizing a dispersion of spherical beads in an acrylic matrix. Further, it will be obvious that the light diffuser will be low in cost and have mechanical properties that allows for insertion into LC devices.

The patterned chill roll used to create the complex lens geometry was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome platted. The resulting complex lenses on the surface of the roll were convex. The single lens patterned roll (control) was manufactured by starting with a copper roll blank and grit blasted with size 14 spherical grit at a pressure of 310 MPa. The resulting single lenses on the surface of the roll were concave.

The patterned chill roll containing the complex lens geometry was utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate with a % light transmission of 97.2%. The polyolefin cast coating coverage was 25.88 g/m$^2$.

The complex lenses were applied to a 100 micrometer commercially available polyester base with a light transmission of 95% (control) and a microvoid polymer base of the invention. The microvoided base consisted of a transparent amorphous film composed of two layers having an overall width of 16 cm was manufactured by a co-extrusion process. One of the layers, hereafter referred to as layer (A), was composed of poly(ethylene terephthalate) ("PET", commercially available from Eastman Chemical Company as Eastapak #7352). The intrinsic viscosity (I.V.) of the PET 7352 resin was 0.74. This layer was 737–864 $\mu$m in thickness. The other layer, hereafter referred to as layer (B), was composed of PET (commercially available from Eastman Chemical Company as Eastapak #9921) impregnated with a voiding agent. The intrinsic viscosity (I.V.) of the PET 9921 resin was 0.80. This layer was 25–152 $\mu$m in thickness.

The voiding agent was created as follows. A 27 mm twin screw compounding extruder heated to 275° C. was used to mix polystyrene beads cross-linked with divinylbenzene with PET 9921. The beads had an average particle diameter of 2 $\mu$m. The beads were added to attain a 20% by weight loading in the PET 9921 matrix. All components were metered into the compounder and one pass was sufficient for dispersion of the beads into the polyester matrix. The compounded material was extruded through a strand die, cooled in a water bath, and pelletized.

Prior to the co-extrusion process, the PET 7352 resin and the compounded pellets were dried separately in desiccated driers at 150° C. for 12 hours. The cast sheets were co-extruded in an A/B layer structure. A standard 3.18 cm diameter screw extruder was used to extrude the PET 7352 resin for layer (A). A standard 1.91 cm diameter screw extruder was used to extrude the compounded pellets for layer (B). The 275° C. meltstreams were fed into a 7 inch multi-manifold die also heated at 275° C. As the extruded sheet emerged from the die, it was cast onto a quenching roll set at 50–60° C. Layer (A) was 864 $\mu$m in thickness. Layer (B) was 25 $\mu$m in thickness.

The amorphous cast sheet was cut into 13 cm×13 cm squares. The sheet was then stretched simultaneously in the X and Y-directions using a standard laboratory film stretching unit. The cast sheet was stretched symmetrically in the X and Y-directions to an extent of 4 times the original sheet dimensions.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers.

The structure of the cast coated diffusion sheet of the invention is as follows, Formed polyolefin lenses
Microvoided polyester base The two diffusion sheets containing formed polymer lenses from above (invention and control), the microvoided polyester sheet and a prior polymer light diffuser containing 8 micrometers polymer beads in an acrylic binder layer coated on a polyester web material were measured for % light transmission, % diffuse light transmission, % specular light transmission and % diffuse reflectance.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 1 below.

TABLE 1

| | Sample | | | |
|---|---|---|---|---|
| | 1 Invention (Voided plus Complex Lenses) | 2 Control (Complex Lenses) | 3 Control (Voided Base) | 4 Control (Prior Art) |
| Total transmission measured at 500 nm | 76.6 | 91.4 | 76.9 | 66.7 |
| Diffuse transmission measured at 500 nm | 73.6 | 82.0 | 71.0 | 65.7 |
| Spectral transmission measured at 500 nm | 1.7 | 9.4 | 5.9 | 1.0 |
| Diffuse reflectance measured at 500 nm | 23.2 | 5.7 | 21.2 | 33.3 |

As the data above clearly indicates, complex polymer lenses formed on the surface of a microvoided polymer base provides excellent light diffusion and % transmission allowing for brighter liquid crystal display devices compared to prior art diffuser materials consisting of spherical beads in a polymer matrix. The diffuse light transmission of 73.6% for the invention materials is significantly better than the prior art materials (65.7%). Both the complex lens and the microvoided base of the invention provides significantly more curved surface area for transmitted light diffusion compared to the complex lens control or the microvoided base control. Diffuse light transmission is important factor in the quality of a LC device in that the diffusion sheet must mask the pattern of the light guide common to LC devices. Surprisingly, the addition of the complex lenses to the voided base only reduced % transmission of the invention by 0.3%, but increased diffuse transmission compared to the voided diffuser control by 2.6% and reduced unwanted specular transmission compared to the voided diffuser control by 4.2%.

Integrating all of the measurements in Table 1, the invention material was significantly better that the prior art material using spherical beads in a matrix for total transmission and diffuse transmission translating allowing for brightness increases in LC devices that utilize the invention materials compared to the prior art materials. The invention materials were also better than the voided polymer control diffuser for both diffuse transmission and spectral transmission. While the % transmission of the invention did not match the performance of the complex lenses applied to a transparent base, the spectral transmission was significantly reduced, significantly reducing "hot spots" on display devices. Further, because the invention material is both a surface and bulk diffuser, the invention can be in optical contact with other optical films to form a light management system and the voided layer provides heat energy insulation, and vibration resistance because of the voided cushion layer used to diffuse light, which has significant commercial value in portable diffusion applications.

Additionally, because the invention materials were constructed on an oriented polyester base, the materials have a higher elastic modulus compared to cast diffuser sheets. The oriented polymer base of the example allow for the light diffuser to be thin and therefore cost efficient and light as the materials content of the example materials is reduced compared to prior art materials.

While this example was primarily directed toward the use of thermoplastic light diffusion materials for LC devices, the materials of the invention have value in other diffusion applications such as back light display, display screens, front projection display devices, imaging elements containing a diffusion layer, a diffuser for specular home lighting and privacy screens, image capture diffusion lenses and greenhouse light diffusion.

| Parts List | |
| --- | --- |
| 2. | Light guide |
| 4. | Lamp Reflector |
| 6. | Reflection tape |
| 8. | Reflection film |
| 10. | Reflection tape |
| 12. | Transparent polymeric diffusion film |
| 14. | Brightness enhancement film |
| 16. | Polarization film |
| 18. | Visible light source |
| 20. | Microvoided polymer base |
| 22. | Major lens |
| 24. | Minor lens |
| 26. | Surface of microvoided polymer base |

What is claimed is:

1. A transparent polymeric diffusion film exhibiting at least 50% transmissivity containing a thermoplastic polymeric material with internal microvoids and containing a plurality of randomly distributed overlapping complex lenses of all different sizes and shapes formed on top of one another on a surface thereof, wherein the diffuse light transmission is at least 80%.

2. The film of claim 1 comprising complex lenses on both the top and bottom surfaces of the film.

3. The film of claim 2 wherein convex lenses are present on the top surface of the film and convex lenses are present on the bottom surface of the film.

4. The film of claim 2 wherein convex lenses are present on the top surface of the film and concave lenses are present on the bottom sure of the film.

5. The film of claim 2 wherein concave lenses are present on the top surface of the film and concave lenses are present on the bottom surface of the film.

6. The film of claim 2 wherein concave lenses are present on the top surface of the film and concave lenses are present on the bottom surface of the film.

7. The film of claim 1 wherein the complex lenses have an average frequency in any direction of between 4 and 250 complex lenses/mm.

8. The film of claim 7 wherein the complex lenses have an average frequency in any direction of between 22 and 66 complex lenses/mm.

9. The film of claim 1 wherein the complex lenses have an average width in the x and y direction of from 3 to 60 micrometers.

10. The film of claim 9 wherein the complex lenses have an average width in the x and y direction of from 15 to 40 micrometers.

11. The film of claim 1 wherein the complex lenses comprise major and minor lenses wherein the diameter of the minor lenses is, on average, not more than 80% of the diameter of the major lenses with which they are associated.

12. The film of claim 11 wherein the number of minor lenses per major lens is, on average, between 2 and 60.

13. The film of claim 12 wherein the number of minor lenses per major lens is, on average, between 5 and 18.

14. The film of claim 1 wherein the complex lens comprise minor lenses that have a width in the x and y direction of from 2 to 20 micrometers.

15. The film of claim 1 wherein the complex lenses comprise minor lenses that have a width in the x and y direction of from 3 to 8 microns and the internal microvoids have a major axis diameter to minor axis diameter ratio of between 3.6 and 1.0.

16. The film of claim 1 wherein the lenses are composed of a material comprising an olefin repeating unit.

17. The film of claim 1 wherein the lenses are composed of a material comprising a carbonate repeating unit.

18. The film of claim 1 wherein the lenses are composed of a material comprising an ester repeating unit.

19. The film of claim 1 wherein the material with internal microvoids is composed of a material that comprises an ester repeating unit.

20. The film of claim 1 wherein the material with internal microvoids is composed of a material that comprises a carbonate repeating unit.

21. The film of claim 1 wherein the material with internal microvoids is composed of a material that comprises an olefin repeating unit.

22. The film of claim 1 wherein the material with internal microvoids is composed of a material that comprises a cellulose acetate.

23. The film of claim 1 wherein the diffuse light transmission is at least 92%.

24. The film of claim 1 wherein the complex lenses are semi-spherical.

25. The film of claim 1 wherein the complex lenses are aspherical.

26. The film of claim 1 wherein the complex lenses have a height/diameter ratio of from 0.03 to 1.0.

27. The film of claim 26 wherein the complex lenses have a height/diameter ratio of from 0.25 to 0.48.

28. The him of claim 1 having a thickness not more micrometers.

29. The film of claim 28 having a thickness of from 12.5 to 50 micrometers.

30. The film of claim 1 wherein the elastic modulus of the film is greater than 500 MPa.

31. The film of claim 1 wherein the difference in refractive index between the thermoplastic polymeric material and the internal microvoids is greater than 0.2.

32. The film of claim 1 wherein the internal microvoids contain organic microspheres.

33. The film of claim 1 wherein the internal microvoids are substantially free of scattering inorganic particles.

34. The film of claim 1 wherein the internal microvoids contain crosslinked polymer beads.

35. The film of claim 34 wherein the crosslinked polymer beads have a mean particle size less than 2.0 micrometers.

36. The film of claim 35 wherein the crosslinked polymer beads have a mean particle size between 0.30 and 1.7 micrometers.

37. The film of claim 1 wherein the internal microvoids contain a gas.

38. The film of claim 1 wherein thickness uniformity across the light film is less than 0.10 micrometers.

39. The film of claim 1 wherein the internal microvoids are substantially circular in the cross section of the plane of the film.

40. The film of claim 1 wherein the internal microvoids have a major axis diameter to minor axis diameter ratio of less 2.0.

41. The film of claim 1 wherein said internal microvoids have a major axis diameter to minor axis diameter ratio of between 1.6 and 1.0.

42. The film of claim 1 wherein said thermoplastic layer contains, on average, greater than 4 index of refraction changes great than 0.20 parallel to the direction of light travel.

43. The film of claim 1 wherein said internal microvoids have an average volume of between 8 and 42 cubic micrometers over an area of 1 cm$^2$.

44. The film of claim 43 wherein said internal microvoids have a average volume of between 12 and 18 cubic micrometers over an area of 1 cm$^2$.

45. A back lighted imaging media comprising a light source and comprising a transparent polymeric diffusion film of claim 1.

46. A liquid crystal device comprising a light source and a transparent polymeric diffusion film of claim 1.

47. A liquid crystal device component comprising a light source and a transparent polymeric diffusion film of claim 1.

48. A transparent film having a substantially circular microvoided polymer base, the film comprising a top and bottom surface, at least one of the surfaces comprising plurality of convex or concave randomly distributed overlapping complex lenses of all different sizes and shapes formed on top of one another, wherein the diffuse light transmission is at least 80%.

49. The film of claim 48 wherein said at least one surface is a surface of the base.

50. The film 48 wherein said at least one surface is a surface of a separate polymer layer integrally disposed on the base.

* * * * *